(12) United States Patent
Hamilton (10) Patent No.: US 12,065,104 B2
(45) Date of Patent: Aug. 20, 2024

(54) GUN LOCK

(71) Applicant: Rob Hamilton, Plainview, TX (US)

(72) Inventor: Rob Hamilton, Plainview, TX (US)

( * ) Notice: Subject to any disclaimer, the term of this patent is extended or adjusted under 35 U.S.C. 154(b) by 123 days.

(21) Appl. No.: 17/931,530

(22) Filed: Sep. 12, 2022

(65) Prior Publication Data

US 2023/0080334 A1 Mar. 16, 2023

Related U.S. Application Data

(60) Provisional application No. 63/242,933, filed on Sep. 10, 2021.

(51) Int. Cl.
*B60R 7/14* (2006.01)

(52) U.S. Cl.
CPC ..................... *B60R 7/14* (2013.01)

(58) Field of Classification Search
CPC ....................................................... B60R 7/14
See application file for complete search history.

(56) References Cited

U.S. PATENT DOCUMENTS

| | | | | |
|---|---|---|---|---|
| 3,556,363 A * | 1/1971 | Whittaker | ................ | B60R 7/14 224/552 |
| 4,611,734 A * | 9/1986 | Luecking | ............ | B60R 11/0241 224/567 |
| 4,922,642 A * | 5/1990 | Ohlhauser | ................ | B60R 7/14 211/64 |
| 6,279,799 B1 * | 8/2001 | Horton | ................ | B60R 7/14 224/572 |
| 7,104,095 B1 * | 9/2006 | Lin | ................ | A44B 11/2573 70/284 |
| 7,181,936 B2 * | 2/2007 | Christensen | ......... | A44B 11/266 70/389 |
| 7,568,367 B2 * | 8/2009 | Huang | ................ | E05B 37/0034 70/284 |
| 8,191,212 B2 * | 6/2012 | Woods | ................ | A01K 27/005 24/615 |
| 8,418,327 B2 * | 4/2013 | Woods | ............... | A44B 11/2576 24/615 |
| 8,438,811 B1 * | 5/2013 | Woodard | ................ | F41C 33/06 52/506.05 |
| 8,627,514 B1 * | 1/2014 | Scoggins | ................. | B60R 7/14 2/2.5 |
| 9,007,171 B2 * | 4/2015 | Yang | ...................... | G05B 15/00 340/5.6 |
| 9,227,573 B2 * | 1/2016 | Hudspeth | .............. | F41C 33/041 |
| 9,481,312 B2 * | 11/2016 | Irwin | ........................ | E05B 73/00 |
| 9,618,287 B2 * | 4/2017 | Milde, Jr. | ......... | H04M 1/72412 |
| 9,677,835 B1 * | 6/2017 | Binns | ....................... | F41A 17/54 |

(Continued)

*Primary Examiner* — Justin M Larson
(74) *Attorney, Agent, or Firm* — Shannon Warren (57) ABSTRACT

A gun lock system for securing a firearm to a buckle receiver assembly. The gun lock system comprises the buckle receiver assembly and a buckle tongue assembly. The gun lock system comprises buckle receiver and the buckle tongue assembly comprises a tongue. The tongue and the buckle receiver are configured to selectively connect to one another. The buckle receiver assembly comprises a mounting extension, the buckle receiver, a locking system, and a fastener receiver. A fastener comprises a tamper proof bolt. A swivel mount is mounted directly to a portion of the firearm. A swivel portion of the swivel mount can allow the buckle tongue assembly to rotate and move freely.

18 Claims, 10 Drawing Sheets

(56) References Cited

U.S. PATENT DOCUMENTS

| | | | | |
|---|---|---|---|---|
| 10,190,339 B1* | 1/2019 | Mack | .................. | E05B 73/0005 |
| 11,305,727 B2* | 4/2022 | Morris | .................... | B60R 22/18 |
| 11,512,915 B2* | 11/2022 | Hamilton | ................ | F41A 17/04 |
| 11,725,906 B2* | 8/2023 | Garcia Ruiz | ............. | B60R 7/14 |
| | | | | 248/314 |
| 11,753,849 B2* | 9/2023 | Fisher | .................... | E05B 67/22 |
| | | | | 70/63 |
| 11,814,014 B2* | 11/2023 | Page | ......................... | B60R 7/14 |
| 2005/0055810 A1* | 3/2005 | Loughlin | ............. | A44B 11/266 |
| | | | | 24/615 |
| 2006/0272368 A1* | 12/2006 | Yu | ......................... | E05B 67/003 |
| | | | | 70/58 |
| 2014/0158730 A1* | 6/2014 | McDonnell | ............... | B60R 7/14 |
| | | | | 224/539 |
| 2014/0183234 A1* | 7/2014 | Hudspeth | ................. | B60R 7/14 |
| | | | | 29/428 |
| 2014/0305175 A1* | 10/2014 | Irwin | ..................... | F41A 23/18 |
| | | | | 70/14 |
| 2015/0075232 A1* | 3/2015 | Milde, Jr. | ............... | E05B 47/00 |
| | | | | 70/53 |
| 2016/0097610 A1* | 4/2016 | Hancosky | ................ | B60R 7/14 |
| | | | | 42/94 |
| 2016/0355139 A1* | 12/2016 | Noonan | .................... | B60R 7/04 |
| 2017/0361776 A1* | 12/2017 | Thorimbert | ............. | F41A 23/18 |
| 2019/0049215 A1* | 2/2019 | Talbot | ................... | F41C 33/046 |
| 2023/0080334 A1* | 3/2023 | Hamilton | ................. | B60R 7/14 |
| | | | | 224/585 |

* cited by examiner

GUN LOCK

CROSS-REFERENCE TO RELATED APPLICATIONS

This application claims benefit to U.S. provisional application 63/242,933 filed Sep. 10, 2021, 43/164,606 filed Jul. 2, 2021, and 63/121,420 filed Dec. 4, 2020.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant.

BRIEF SUMMARY OF THE INVENTION

A gun lock system for securing a firearm to a buckle receiver assembly. Said gun lock system comprises said buckle receiver assembly and a buckle tongue assembly. Said gun lock system comprises buckle receiver and said buckle tongue assembly comprises a tongue. Said tongue and said buckle receiver are configured to selectively connect to one another. Said buckle receiver assembly comprises a mounting extension, said buckle receiver, a locking system, and a fastener receiver. A fastener comprises a tamper proof bolt. A swivel mount is mounted directly to a portion of said firearm. A swivel portion of said swivel mount can allow said buckle tongue assembly to rotate and move freely.

Said gun lock system for securing said firearm to said buckle receiver assembly. Said gun lock system comprises said buckle receiver assembly and said buckle tongue assembly. Said buckle receiver assembly comprises said locking system, and said fastener receiver. Said gun lock system comprises said buckle receiver. Said buckle tongue assembly comprises said tongue. Said locking system is configured to securely hold said buckle tongue assembly when in a locked configuration. Said tongue and said buckle receiver are configured to selectively connect to one another.

Said gun lock system for securing said firearm to said buckle receiver assembly. Said gun lock system comprises said buckle receiver assembly and said buckle tongue assembly. Said buckle receiver assembly comprises said locking system, and said fastener receiver. Said gun lock system comprises said buckle receiver. Said buckle tongue assembly comprises said tongue. Said locking system is configured to securely hold said buckle tongue assembly when in a locked configuration. Said tongue and said buckle receiver are configured to selectively connect to one another. Said gun lock system can further comprise a fixture mount assembly configured to attach said buckle receiver assembly to a fixed surface such as a wall. Said fixture mount assembly comprises a mounting plate and one or more fasteners. Said mounting extension can attach said buckle receiver to said mounting plate, and said one or more fasteners is screwed into said wall to secure said gun lock system to said wall. Said one or more fasteners comprises said tamper proof bolt.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

This application claims benefit to U.S. patent applications 43/164,606 and 63/121,420, which are hereby incorporated by reference.

Figure 1:
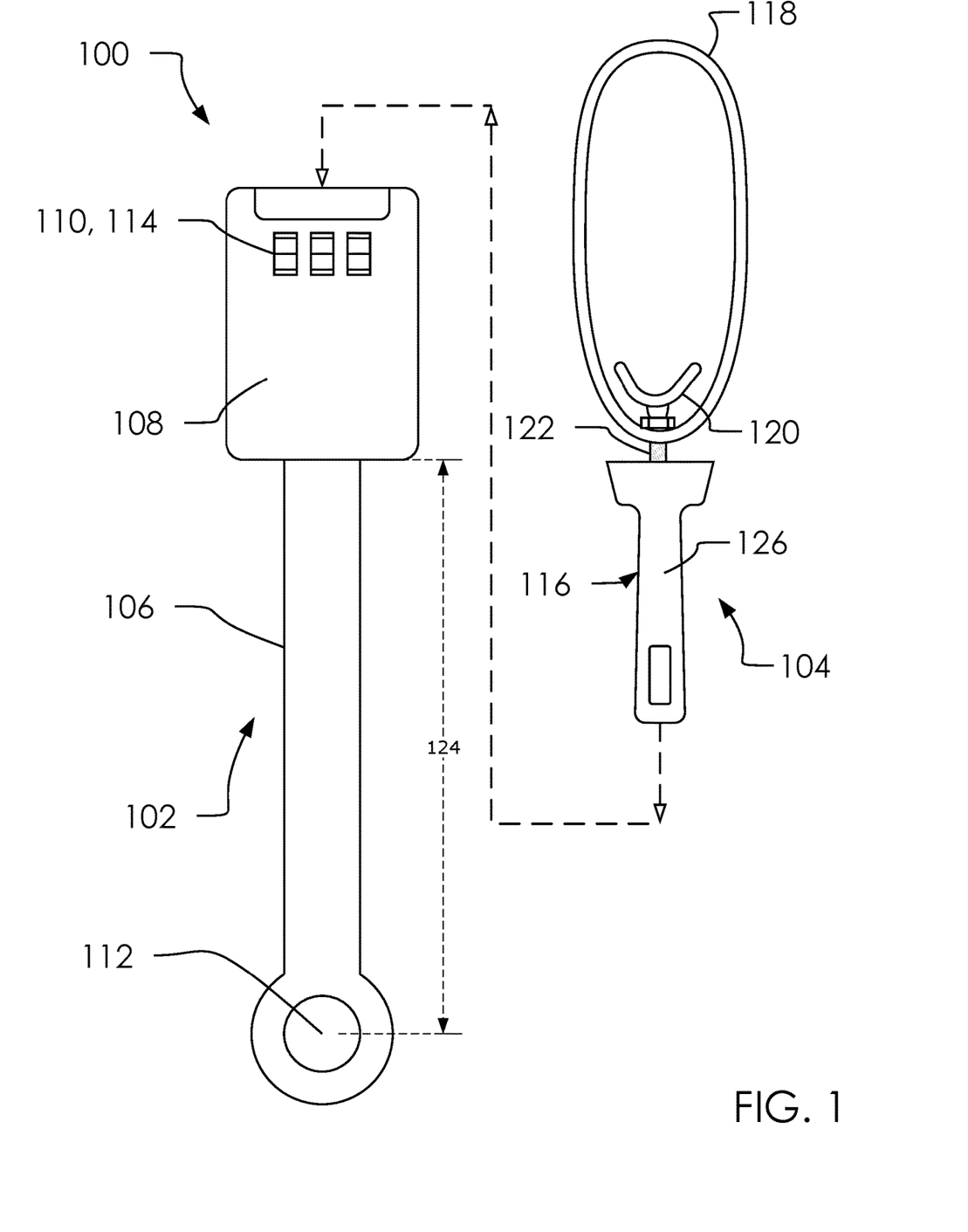
FIG. 1 illustrates an elevated side view of a gun lock system 100.

FIG. 1 illustrates an elevated side view of a gun lock system 100.

In one embodiment, said gun lock system 100 can comprise a buckle receiver assembly 102 and a buckle tongue assembly 116. Said gun lock system 100 can comprise buckle receiver 108 and said buckle tongue assembly 116 can comprise a tongue 126; wherein said tongue 126 and said buckle receiver 108 can be configured to selectively connect to one another.

In one embodiment, said buckle receiver assembly 102 can comprise a mounting extension 106, said buckle receiver 108, a locking system 110, and a fastener receiver 112.

In one embodiment, said locking system 110 can comprise a combination lock 114, as illustrated.

Said buckle tongue assembly 116 can be a part of a buckle tongue and gun grip assembly 104, as illustrated. In one embodiment, said buckle tongue and gun grip assembly 104 can comprise said buckle tongue assembly 116, a gun strap 118, a gun cradle 120, and an adjustable cradle extender 122.

In one embodiment, said mounting extension 106 can comprise an extension length 124 being adapted as necessary to fit various vehicles, as would be obvious to one skilled in the art.

Figure 2:
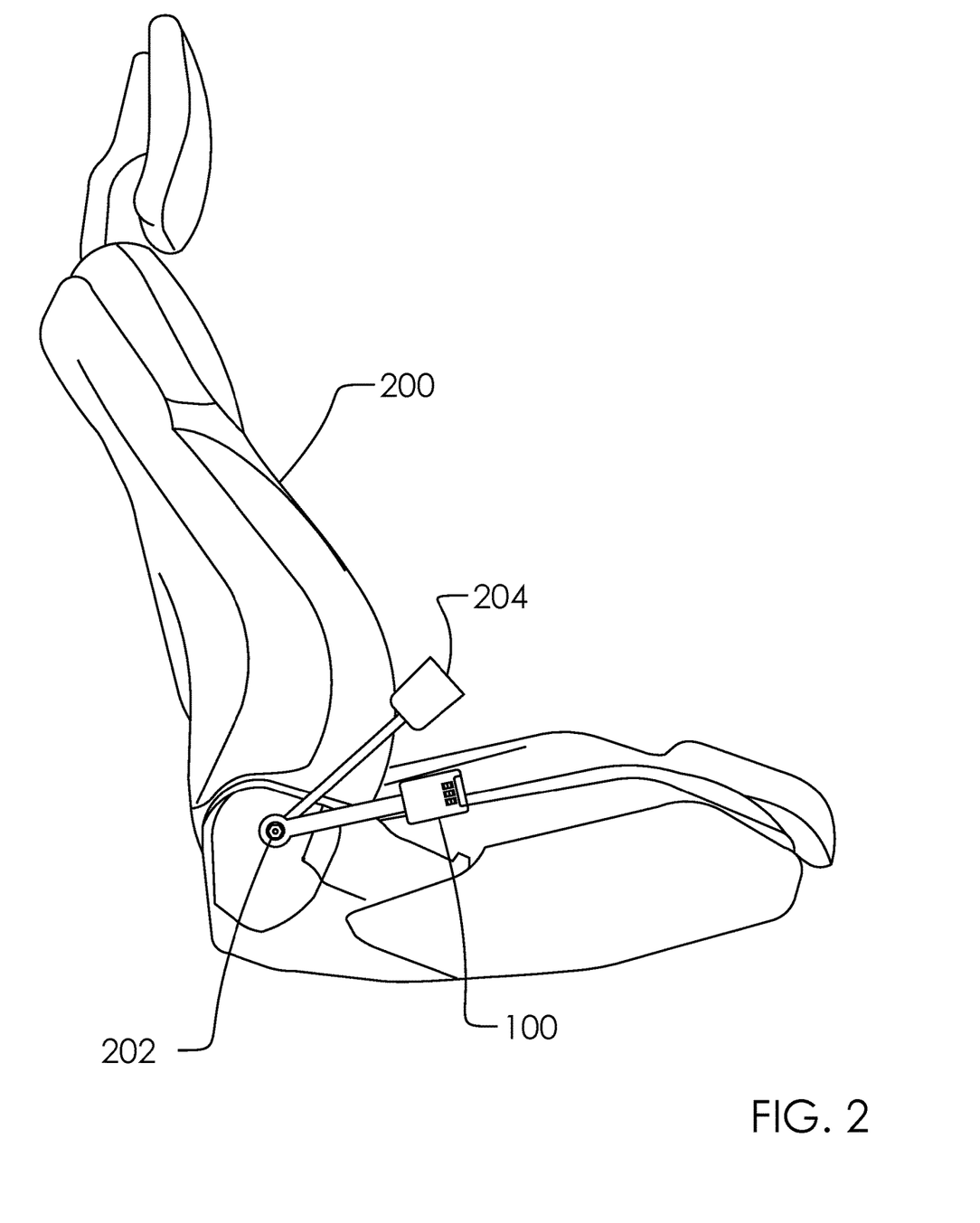
FIG. 2 illustrates an elevated side view of a vehicle seat 200 with said gun lock system 100 attached thereto.

FIG. 2 illustrates an elevated side view of a vehicle seat 200 with said gun lock system 100 attached thereto.

In one embodiment, said vehicle seat 200 can comprise a fastener 202 for holding a standard seatbelt receiver 204. In one embodiment, said gun lock system 100 can be attached to a portion of a vehicle by attaching said fastener receiver 112 to a portion of said vehicle seat 200 using said fastener 202. In another embodiment, said vehicle seat 200 can be attached to a new fastener added to said vehicle, although not illustrated here.

Figure 3A:
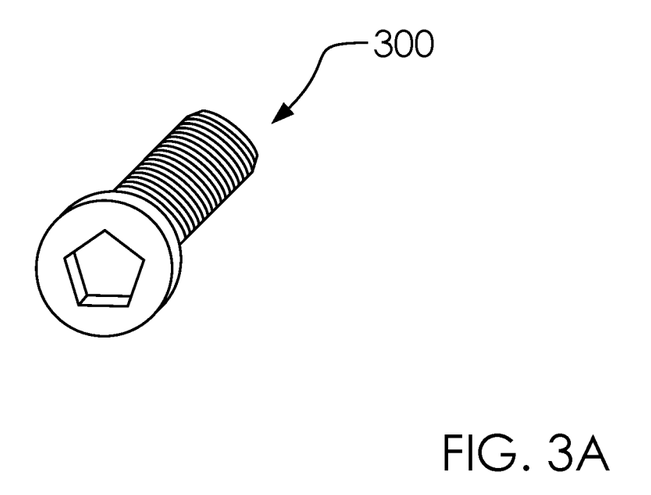
FIGS. 3A, and 3B illustrate a perspective overview and elevated side view of a tamper proof bolt 300.
Figure 3B:
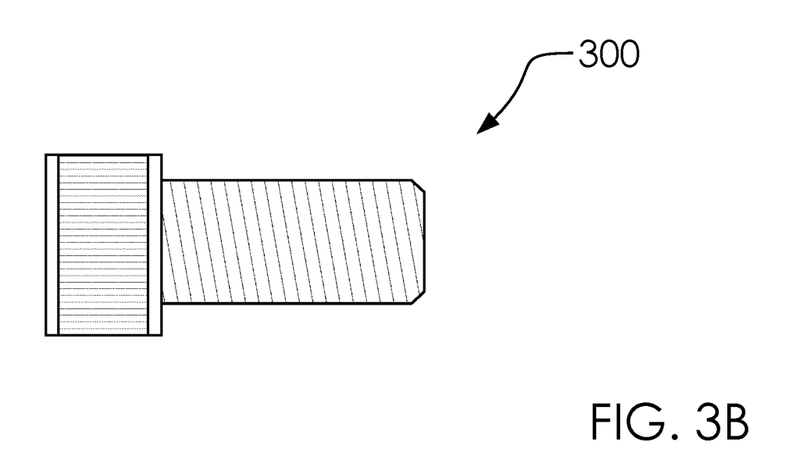

FIGS. 3A, and 3B illustrate a perspective overview and elevated side view of a tamper proof bolt 300.

In one embodiment, said fastener 202 can comprise said tamper proof bolt 300.

Figure 4:
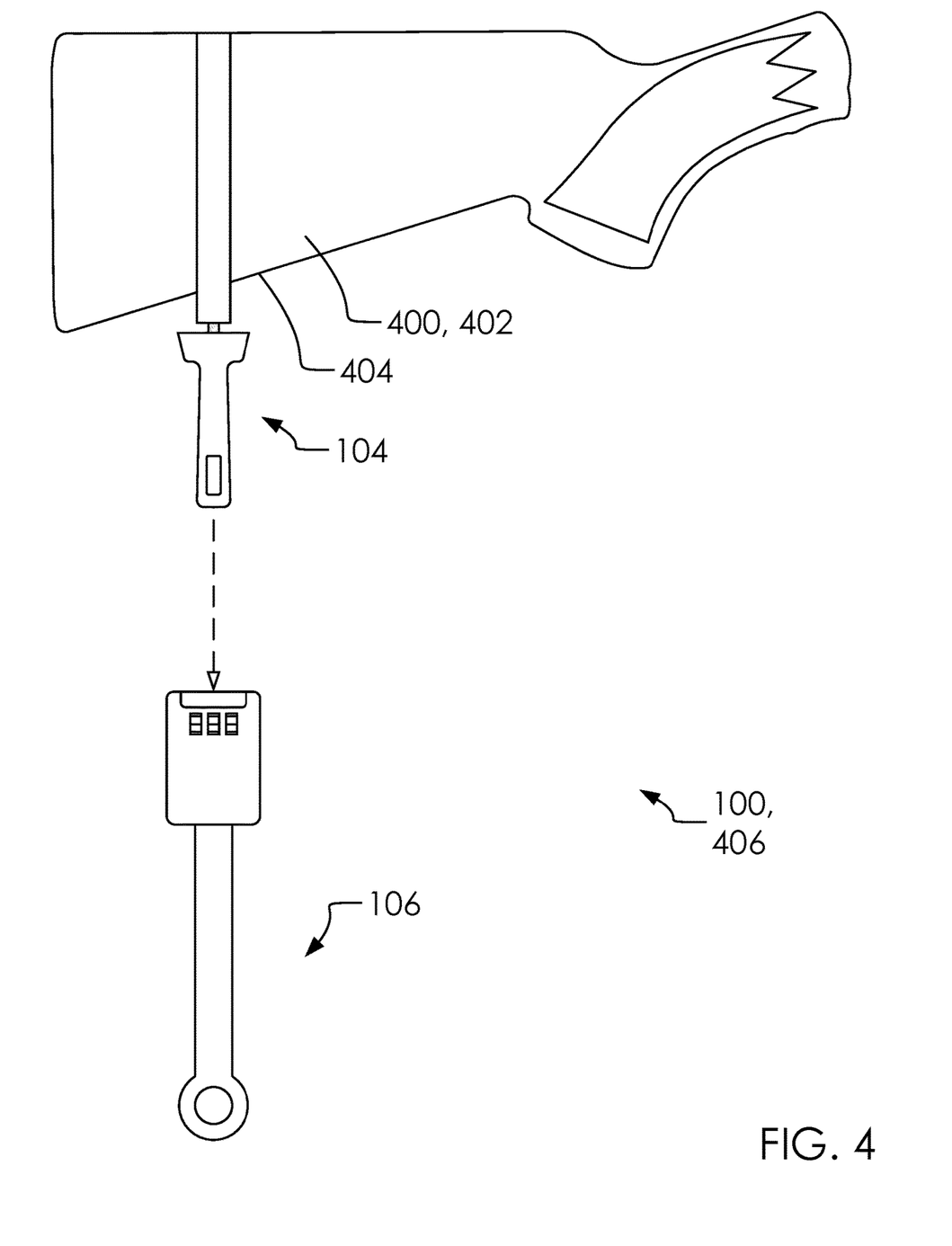
FIG. 4 illustrates an elevated side view of a buckle tongue and gun grip assembly 104 attached to a portion of a firearm 400 and said gun lock system 100 in a detached configuration 406.

FIG. 4 illustrates an elevated side view of said buckle tongue and gun grip assembly 104 attached to a portion of a firearm 400 and said gun lock system 100 in a detached configuration 406.

In one embodiment, said firearm 400 can comprise a buttstock 402, and said gun lock system 100 can be configured to attach to a portion of said buttstock 402. In one embodiment, said gun strap 118 can wrap around a portion of said buttstock 402, and said gun cradle 120 can be pressed into an underside 404 of said buttstock 402. By tightening said fastener receiver 112 into said underside 404 of said buttstock 402, said buckle tongue and gun grip assembly 104 can be held securely to said firearm 400.

Figure 5:
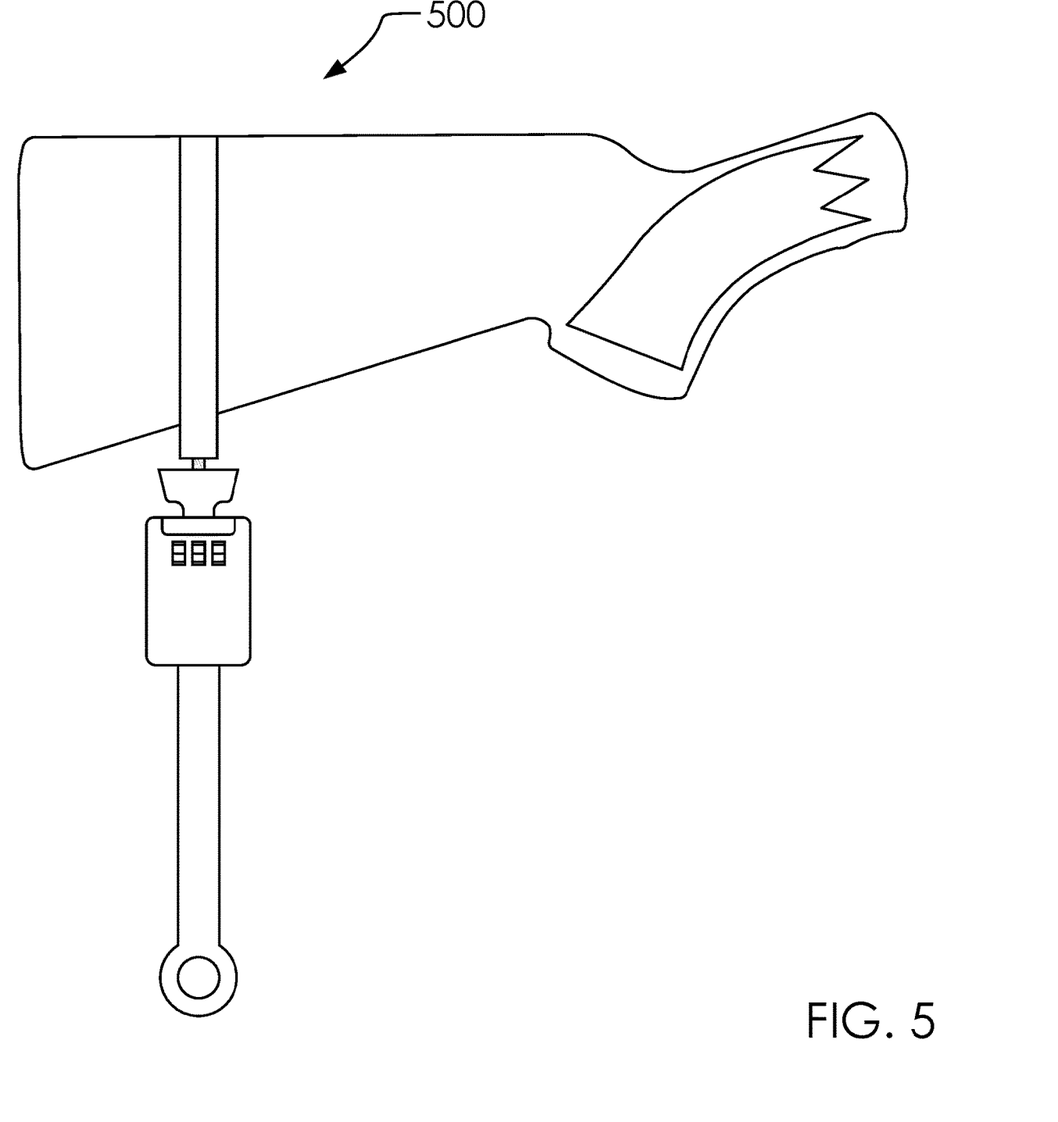
FIG. 5 illustrates said gun lock system 100 in an assembled configuration 500 on said firearm 400 in an elevated side view.

FIG. 5 illustrates said gun lock system 100 in an assembled configuration 500 on said firearm 400 in an elevated side view.

Figure 6:
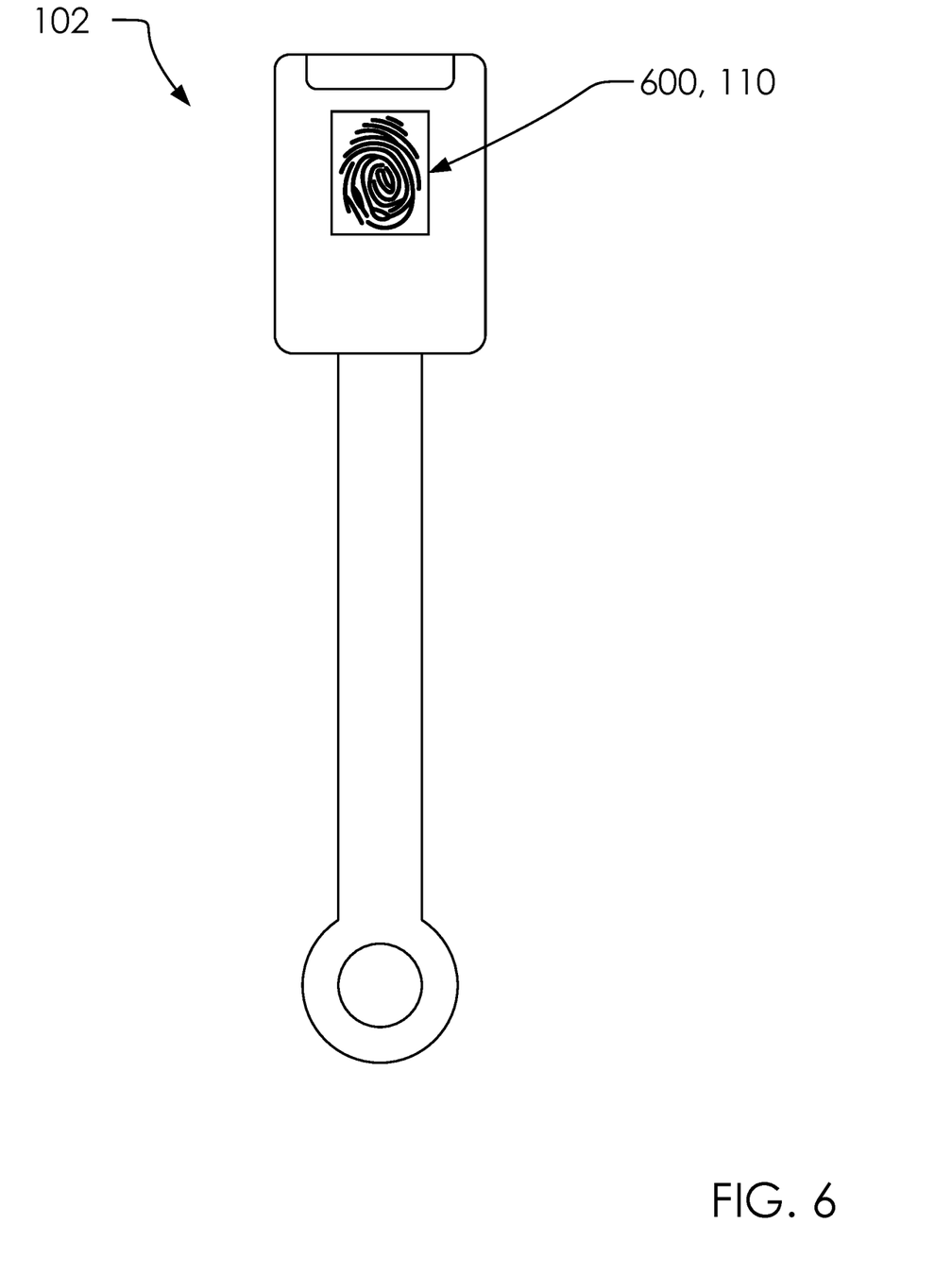
FIG. 6 illustrates an elevated side view of said gun lock system 100 with a fingerprint reader 600.

FIG. 6 illustrates an elevated side view of said gun lock system 100 with a fingerprint reader 600.

One key feature of said gun lock system 100 is the ability lock and unlock said buckle receiver assembly 102 from said buckle tongue and gun grip assembly 104 using various types of locking mechanisms. For example, as illustrated and discussed above, said locking system 110 can comprise said combination lock 114.

In another embodiment, said locking system 110 can comprise said fingerprint reader 600. Wherein, said gun lock system 100 can be configured to automatically lock when said buckle receiver assembly 102 and said buckle tongue and gun grip assembly 104 are joined; and remain locked until an authorized party presses a fingerprint onto said fingerprint reader 600.

Figure 7:
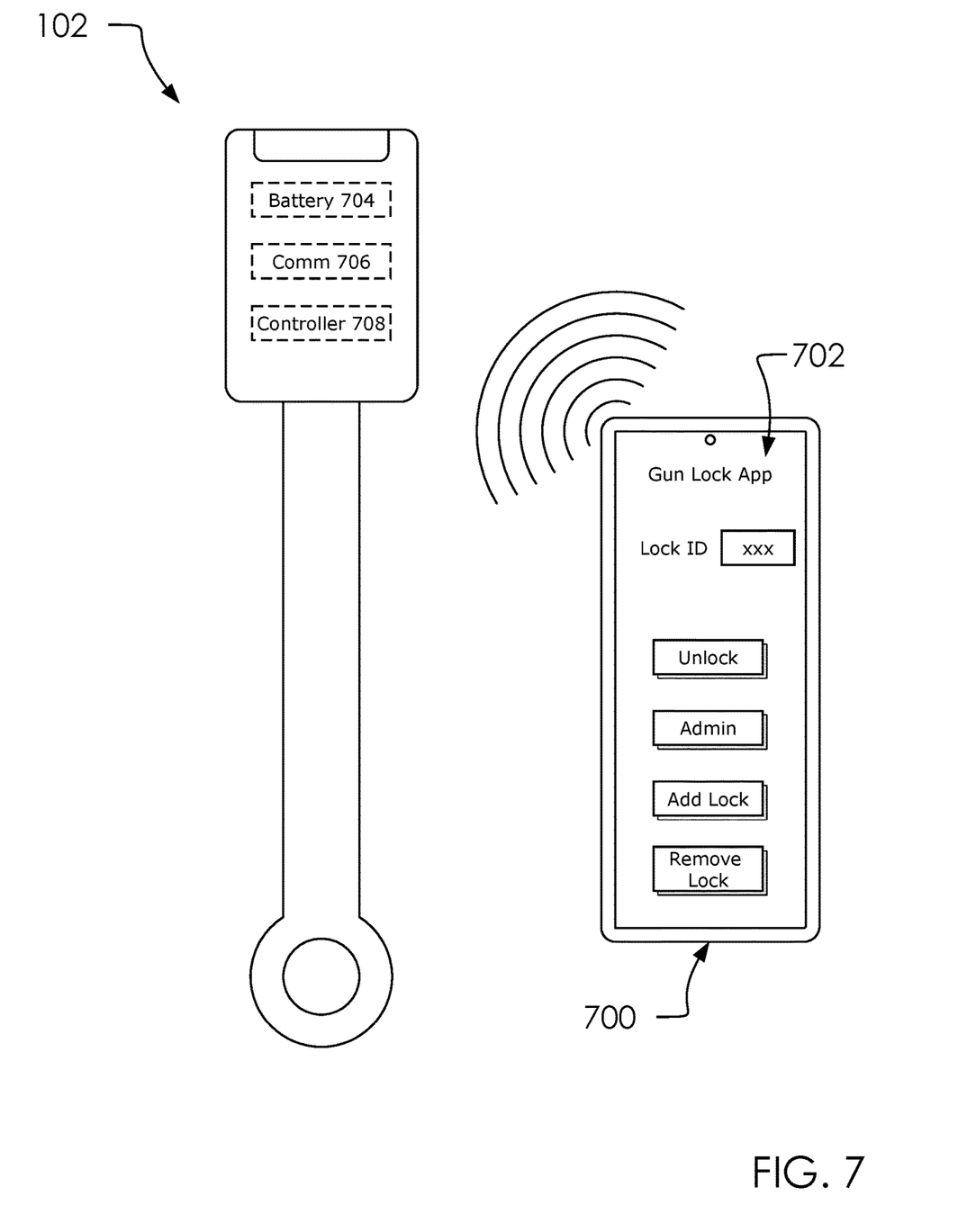
FIG. 7 illustrates a smart phone 700 displaying a gun lock app 702 alongside a buckle receiver assembly 102.

FIG. 7 illustrates a smart phone 700 displaying a gun lock app 702 alongside said buckle receiver assembly 102.

In one embodiment, said gun lock system 100 can further comprise said gun lock app 702 configured to run on said smart phone 700, as is known in the art. In one embodiment, said gun lock system 100 can connect to said smart phone 700 and communicate with said gun lock app 702.

Said gun lock app 702 can be configured to add and remove locks from a user's profile, lock and unlock one or more of said locking system 110, and remotely manage said locking system 110.

In one embodiment, said locking system 110 can comprise a battery 704, a communication module 706 and a controller 708 to facilitate communication with said smart phone 700, as is known in the art. Wherein, said controller can be configured to lock and unlock said locking system 110.

Figure 8:
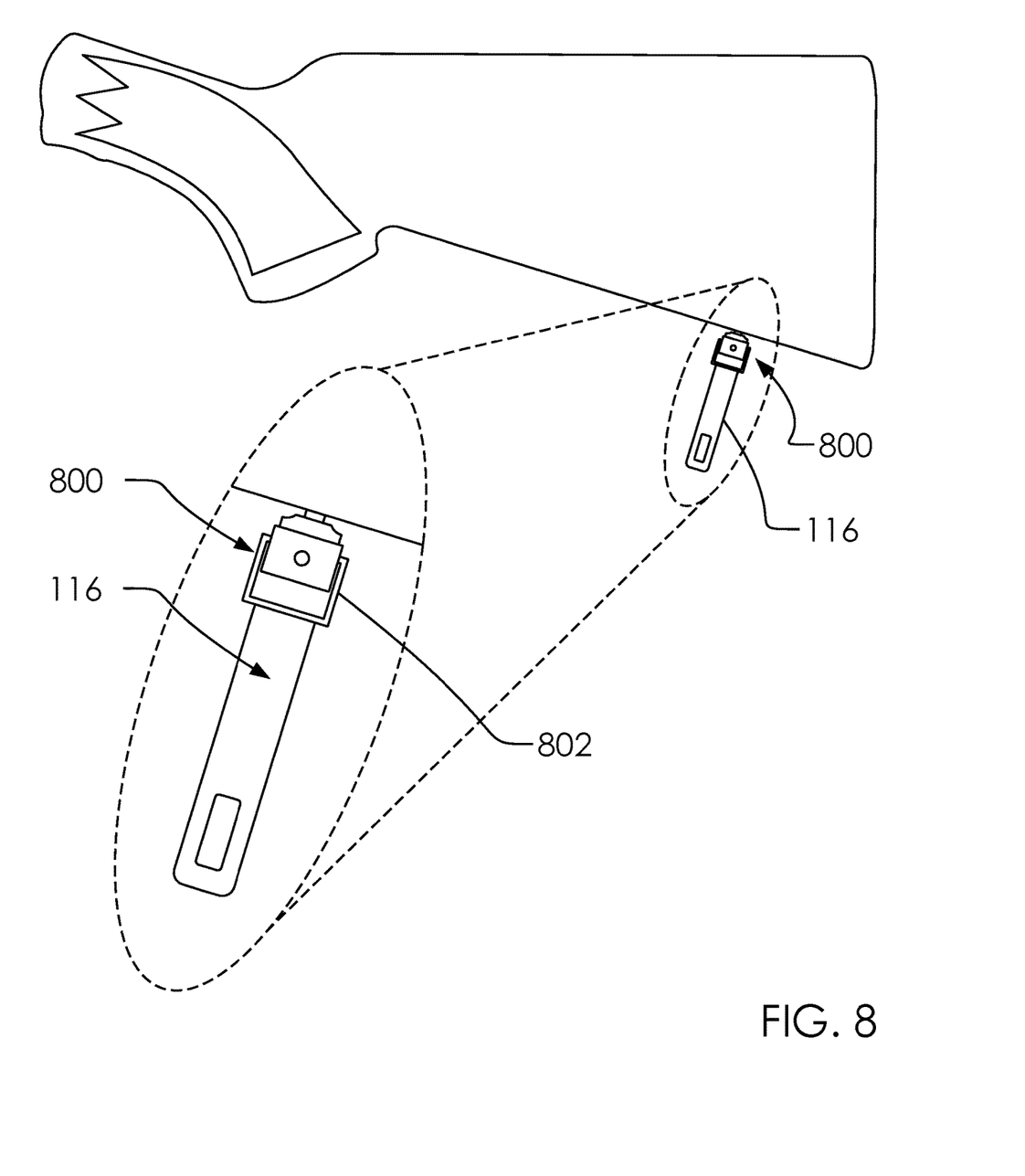
FIG. 8 illustrates an elevated side view of a buckle tongue assembly 116 on a swivel mount 800.

FIG. 8 illustrates an elevated side view of said buckle tongue assembly 116 on a swivel mount 800.

In one embodiment, said swivel mount 800 can be mounted directly to a portion of said firearm 400, as illustrated. Wherein, a swivel portion 802 of said swivel mount 800 can allow said buckle tongue assembly 116 to rotate and move freely.

Figure 9A:
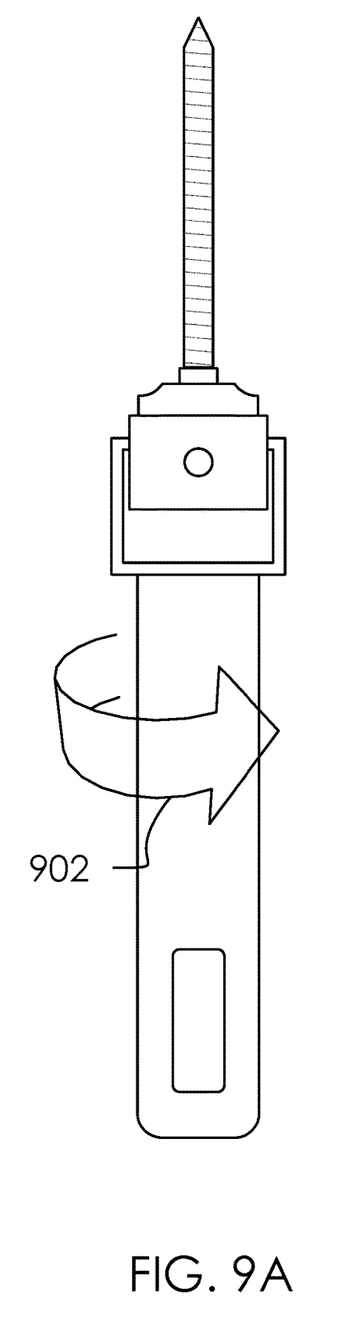
FIGS. 9A, 9B and 9C illustrate a first, second and third elevated side view of said swivel mount 800.
Figure 9B:
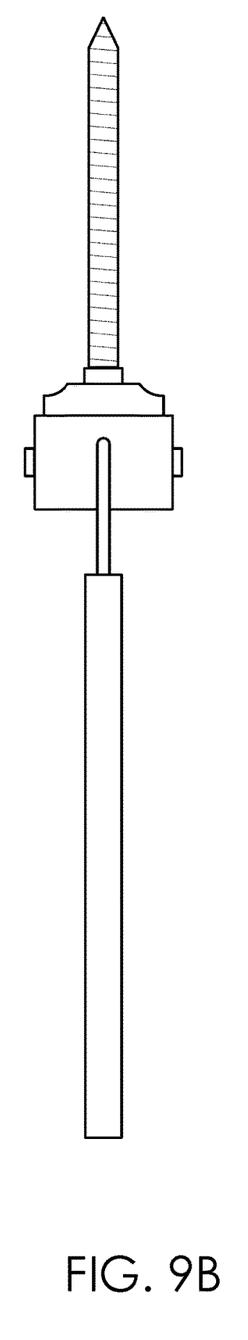
Figure 9C:
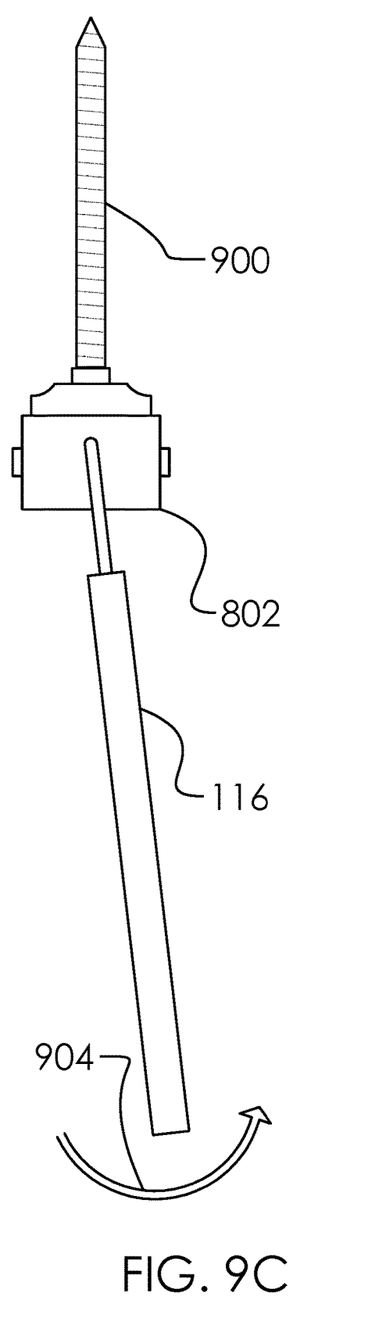

FIGS. 9A, 9B and 9C illustrate a first, second and third elevated side view of said swivel mount 800.

In one embodiment, said swivel mount 800 can comprise a threaded shaft 900 configured to screw into a portion of said firearm 400.

In one embodiment, said threaded shaft 900 can be screwed into a portion of 'said firearm 400, and said swivel portion 802 can allow said buckle tongue assembly 116 to rotate in one or more axes of rotation. For example, said swivel portion 802 can allow said swivel mount 800 to rotate in a first axis 902 aligned with said threaded shaft 900 and a second axis 904 being perpendicular from said threaded shaft 900.

Figure 10A:
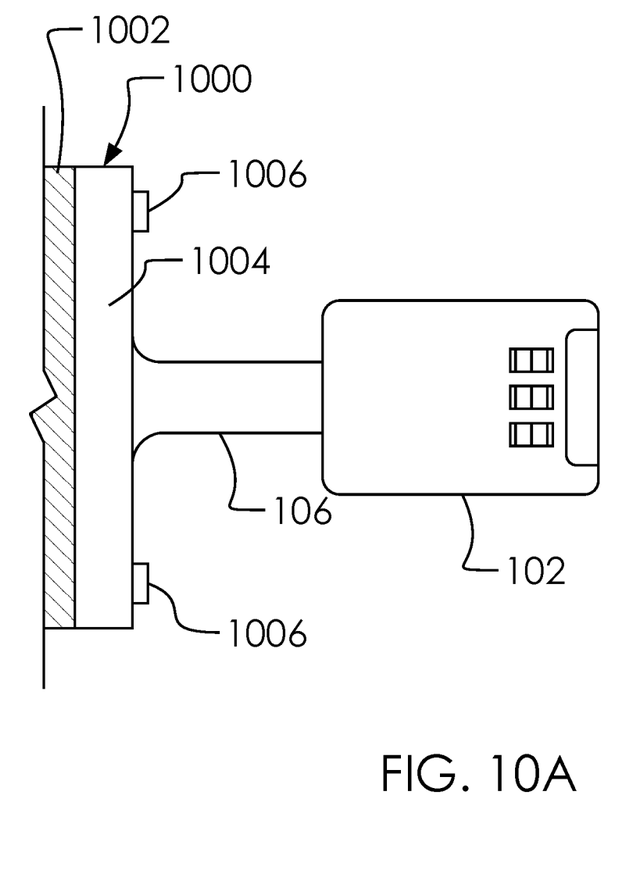
FIGS. 10A and 10B illustrate a side and top view of said buckle receiver assembly 102 on a fixture mount assembly 1000.
Figure 10B:
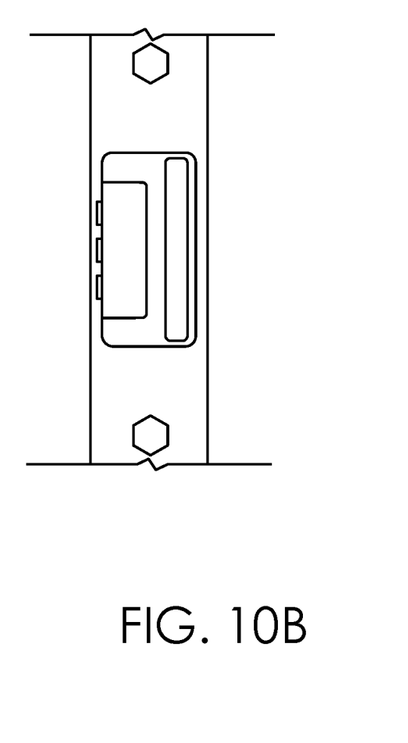

FIGS. 10A and 10B illustrate a side and top view of said buckle receiver assembly 102 on a fixture mount assembly 1000.

In one embodiment, said gun lock system 100 can further comprise said fixture mount assembly 1000 configured to attach said buckle receiver assembly 102 to a fixed surface such as a wall 1002.

In one embodiment, said fixture mount assembly 1000 can comprise a mounting plate 1004 and one or more fasteners 1006, as illustrated. In one embodiment, said mounting extension 106 can attach said buckle receiver 108 to said mounting plate 1004, and said one or more fasteners 1006 can be screwed into said wall 1002 to secure said gun lock system 100 to said wall 1002. In one embodiment, said one or more fasteners 1006 can comprise said tamper proof bolt 300, as discussed above.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The following comprises a summary of the parts disclosed above and in the figures:
- said gun lock system 100,
- Said buckle receiver assembly 102,
- Said buckle tongue assembly 116,
- Said buckle receiver 108,
- Said tongue 126,
- Said mounting extension 106,
- Said locking system 110,
- Said fastener receiver 112,
- Said combination lock 114,
- Said buckle tongue and gun grip assembly 104,
- Said gun strap 118,
- Said gun cradle 120,
- Said adjustable cradle extender 122,
- Said extension length 124,
- Said vehicle seat 200,
- Said fastener 202,
- Said standard seatbelt receiver 204,
- Said tamper proof bolt 300,
- Said firearm 400,
- Said detached configuration 406,
- Said buttstock 402,
- Said underside 404,
- Said assembled configuration 500,
- Said fingerprint reader 600,
- Said smart phone 700,
- Said gun lock app 702,
- Said swivel mount 800,
- Said swivel portion 802,
- Said threaded shaft 900,
- Said fixture mount assembly 1000,
- Said wall 1002,
- Said mounting plate 1004,
- Said one or more fasteners 1006,
- Said battery 704,
- Said communication module 706, and
- said controller 708.

The following comprises a preferred embodiment as discussed in the original claims:
said gun lock system 100 for securing said firearm 400 to said buckle receiver assembly 102. Said gun lock system 100 comprises said buckle receiver assembly 102 and said buckle tongue assembly 116. Said gun lock system 100 comprises said buckle receiver 108 and said buckle tongue assembly 116 comprises said tongue 126. Said tongue 126 and said buckle receiver 108 can be configured to selectively connect to one another. Said buckle receiver assembly 102 comprises said mounting extension 106, said buckle receiver 108, said locking system 110, and said fastener receiver 112. Said fastener 202 comprises said tamper proof bolt 300. Said swivel mount 800 can be mounted directly to a portion of said firearm 400. Said swivel portion 802 of said swivel mount 800 can allow said buckle tongue assembly 116 to rotate and move freely.

Said gun lock system 100 for securing said firearm 400 to said buckle receiver assembly 102. Said gun lock system 100 comprises said buckle receiver assembly 102 and said buckle tongue assembly 116. Said gun lock system 100 comprises said buckle receiver 108 and said buckle tongue assembly 116 comprises said tongue 126. Said tongue 126 and said buckle receiver 108 can be configured to selectively connect to one another. Said buckle receiver assembly 102 comprises said mounting extension 106, said buckle receiver 108, said locking system 110, and said fastener receiver 112.

Said fastener 202 comprises said tamper proof bolt 300. Said swivel mount 800 can be mounted directly to a portion of said firearm 400. Said swivel portion 802 of said swivel mount 800 can allow said buckle tongue assembly 116 to rotate and move freely.

Said gun lock system 100 for securing said firearm 400 to said buckle receiver assembly 102. Said gun lock system 100 comprises said buckle receiver assembly 102 and said buckle tongue assembly 116. Said buckle receiver assembly 102 comprises said locking system 110, and said fastener receiver 112. Said gun lock system 100 comprises said buckle receiver 108. Said buckle tongue assembly 116 comprises said tongue 126. Said locking system 110 can be configured to securely hold said buckle tongue assembly 116 when in a locked configuration. Said tongue 126 and said buckle receiver 108 can be configured to selectively connect to one another.

Said buckle receiver assembly 102 comprises said mounting extension 106, and said buckle receiver 108.

Said locking system 110 comprises said combination lock 114.

Said buckle tongue assembly 116 can be a part of said buckle tongue and gun grip assembly 104. Said buckle tongue and gun grip assembly 104 comprises said buckle tongue assembly 116, said gun strap 118, said gun cradle 120, and said adjustable cradle extender 122.

Said firearm 400 comprises said buttstock 402, and said gun lock system 100 can be configured to attach to a portion of said buttstock 402. Said gun strap 118 can wrap around a portion of said buttstock 402, and said gun cradle 120 can be pressed into said underside 404 of said buttstock 402. By tightening said fastener receiver 112 into said underside 404 of said buttstock 402, said buckle tongue and gun grip assembly 104 can be held securely to said firearm 400.

Said mounting extension 106 comprises said extension length 124 being adapted as necessary to fit various vehicles.

Said vehicle seat 200 comprises said fastener 202 for holding said standard seatbelt receiver 204. Said gun lock system 100 can be attached to a portion of a vehicle by attaching said fastener receiver 112 to a portion of said vehicle seat 200 using said fastener 202.

Said vehicle seat 200 comprises said standard seatbelt receiver 204 in addition to said buckle receiver assembly 102 of said gun lock system 100. Said buckle receiver assembly 102 can be configured to receive said buckle tongue assembly 116.

Said fastener 202 comprises said tamper proof bolt 300.

Said locking system 110 comprises said fingerprint reader 600.

Said gun lock system 100 can be configured to automatically lock when said buckle receiver assembly 102 and said buckle tongue and gun grip assembly 104 can be joined. remain locked until an authorized party presses a fingerprint onto said fingerprint reader 600.

Said gun lock system 100 can further comprise said gun lock app 702 configured to run on said smart phone 700. Said gun lock system 100 connects to said smart phone 700 and communicate with said gun lock app 702. Said gun lock app 702 can be configured to add and remove one or more of said locking system 110 from a user's profile. Said gun lock app 702 can be configured to lock and unlock one or more of said locking system 110. Said gun lock app 702 can be configured to remotely manage said locking system 110. Said locking system 110 comprises a battery, communication module and a controller to facilitate communication with said smart phone 700. said controller can be configured to lock and unlock said locking system 110.

Said swivel mount 800 can be mounted directly to a portion of said firearm 400. Said swivel portion 802 of said swivel mount 800 can allow said buckle tongue assembly 116 to rotate and move freely.

Said swivel mount 800 comprises said threaded shaft 900 configured to screw into a portion of said firearm 400.

Said gun lock system 100 can further comprise said fixture mount assembly 1000 configured to attach said buckle receiver assembly 102 to a fixed surface such as said wall 1002. Said fixture mount assembly 1000 comprises said mounting plate 1004 and said one or more fasteners 1006. Said mounting extension 106 can attach said buckle receiver 108 to said mounting plate 1004, and said one or more fasteners 1006 can be screwed into said wall 1002 to secure said gun lock system 100 to said wall 1002. Said one or more fasteners 1006 comprises said tamper proof bolt 300.

The invention claimed is:

1. A gun lock system for securing a firearm to a buckle receiver assembly, wherein:
    said gun lock system comprises said buckle receiver assembly and a buckle tongue assembly;
    said buckle receiver assembly comprises a buckle receiver, a locking system, and a fastener receiver;
    said buckle tongue assembly comprises a tongue;
    said locking system is configured to securely hold said buckle tongue assembly when in a locked configuration; and
    said tongue and said buckle receiver are configured to selectively connect to one another;
    said gun lock system is configured to connect to a fastener of a vehicle seat of a seatbelt receiver;
    said gun lock system is attached to a portion of a vehicle by attaching said fastener receiver to a portion of said vehicle seat using said fastener.

2. The gun lock system of claim 1, wherein:
    said buckle receiver assembly comprises a mounting extension, and said buckle receiver.

3. The gun lock system of claim 1, wherein:
    said locking system comprises a combination lock.

4. The gun lock system of claim 1, wherein:
    said buckle receiver assembly comprises a mounting extension, and said buckle receiver; and
    said mounting extension comprises an extension length being adapted as necessary to fit various vehicles.

5. The gun lock system of claim 1, wherein:
    said vehicle seat comprises said standard seatbelt receiver in addition to said buckle receiver assembly of said gun lock system; and
    said buckle receiver assembly is configured to receive said buckle tongue assembly.

6. The gun lock system of claim 1, wherein:
    said gun lock system can further comprise a gun lock app configured to run on a smart phone;
    said gun lock system connects to said smart phone and communicates with said gun lock app;
    said gun lock app is configured to add and remove one or more of said locking system from a user's profile;
    said gun lock app is configured to lock and unlock one or more of said locking system;
    said gun lock app is configured to remotely manage said locking system;
    said locking system comprises a battery, communication module and a controller to facilitate communication with said smart phone; and
    said controller is configured to lock and unlock said locking system.

7. The gun lock system of claim 1, wherein:
    said gun lock system can further comprise a fixture mount assembly configured to attach said buckle receiver assembly to a fixed surface such as a wall;
    said fixture mount assembly comprises a mounting plate and one or more fasteners;
    said mounting extension can attach said buckle receiver to said mounting plate, and said one or more fasteners is screwed into said wall to secure said gun lock system to said wall.

8. The gun lock system of claim 1, wherein:
    a swivel mount is configured to be mounted directly to a portion of said firearm; and
    a swivel portion of said swivel mount can allow said buckle tongue assembly to rotate and move freely.

9. The gun lock system of claim 8, wherein:
    said swivel mount comprises a threaded shaft configured to screw into a portion of said firearm.

10. The gun lock system of claim 1, wherein:
    said buckle tongue assembly is a part of a buckle tongue and gun grip assembly; and
    said buckle tongue and gun grip assembly comprises said buckle tongue assembly, a gun strap, a gun cradle, and an adjustable cradle extender.

11. The gun lock system of claim 10, wherein:
    said firearm comprises a buttstock, and said gun lock system is configured to attach to a portion of said buttstock;
    said gun strap can wrap around a portion of said buttstock, and said gun cradle is pressed into an underside of said buttstock; and
    by tightening said fastener receiver into said underside of said buttstock, said buckle tongue and gun grip assembly is held securely to said firearm.

12. The gun lock system of claim 10, wherein:
    said locking system comprises a fingerprint reader.

13. The gun lock system of claim 12, wherein:
    said gun lock system is configured to automatically lock when said buckle receiver assembly and said buckle tongue and gun grip assembly are joined and remain locked until an authorized party presses a fingerprint onto said fingerprint reader.

14. A gun lock system for securing a firearm to a buckle receiver assembly, wherein:
    said gun lock system comprises said buckle receiver assembly and a buckle tongue assembly;
    said buckle receiver assembly comprises a buckle receiver, a locking system, and a fastener receiver;
    said buckle tongue assembly comprises a tongue;
    said locking system is configured to securely hold said buckle tongue assembly when in a locked configuration;
    said tongue and said buckle receiver are configured to selectively connect to one another;
    said buckle tongue assembly is a part of a buckle tongue and gun grip; and
    said buckle tongue and gun grip assembly comprises said buckle tongue assembly, a gun strap, a gun cradle, and an adjustable cradle extender.

15. The gun lock system of claim 14, wherein:
said firearm comprises a buttstock, and said gun lock system is configured to attach to a portion of said buttstock;
said gun strap can wrap around a portion of said buttstock, and said gun cradle is pressed into an underside of said buttstock; and
by tightening said fastener receiver into said underside of said buttstock, said buckle tongue and gun grip assembly is held securely to said firearm.

16. A gun lock system for securing a firearm to a buckle receiver assembly, wherein:
said gun lock system comprises said buckle receiver assembly and a buckle tongue assembly;
said buckle receiver assembly comprises a buckle receiver, a locking system, and a fastener receiver;
said buckle tongue assembly comprises a tongue;
said locking system is configured to securely hold said buckle tongue assembly when in a locked configuration;
said tongue and said buckle receiver are configured to selectively connect to one another;
a swivel mount is configured to be mounted directly to a portion of said firearm; and
a swivel portion of said swivel mount can allow said buckle tongue assembly to rotate and move freely.

17. The gun lock system of claim 16, wherein:
said swivel mount comprises a threaded shaft configured to screw into a portion of said firearm.

18. A gun lock system for securing a firearm to a buckle receiver assembly, wherein:
said gun lock system comprises said buckle receiver assembly and a buckle tongue assembly;
said buckle receiver assembly comprises a buckle receiver, a locking system, and a fastener receiver;
said buckle tongue assembly comprises a tongue;
said locking system is configured to securely hold said buckle tongue assembly when in a locked configuration; and
said tongue and said buckle receiver are configured to selectively connect to one another; and
said gun lock system is attached to a portion of a vehicle by inserting said fastener through said fastener receiver and into a portion of a vehicle seat.

\* \* \* \* \*